Figure 1:
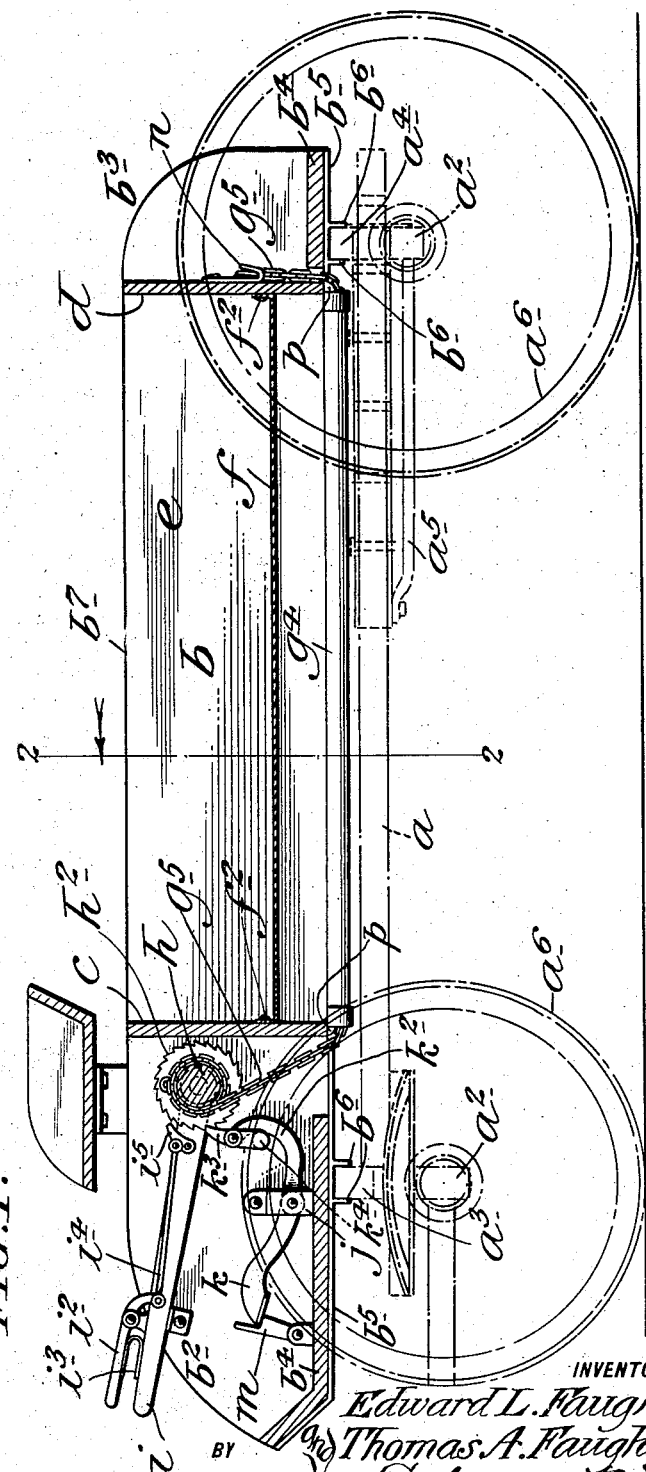

No. 888,601. PATENTED MAY 26, 1908.
T. A. & E. L. FAUGHNAN.
DUMPING BED OR BODY FOR VEHICLES.
APPLICATION FILED SEPT. 9, 1907.
2 SHEETS—SHEET 1.

WITNESSES
INVENTORS.
Edward L. Faughnan,
Thomas A. Faughnan,
BY Edgar Tate & Co
ATTORNEYS No. 888,601. PATENTED MAY 26, 1908.
T. A. & E. L. FAUGHNAN.
DUMPING BED OR BODY FOR VEHICLES.
APPLICATION FILED SEPT. 9, 1907.
2 SHEETS—SHEET 2.
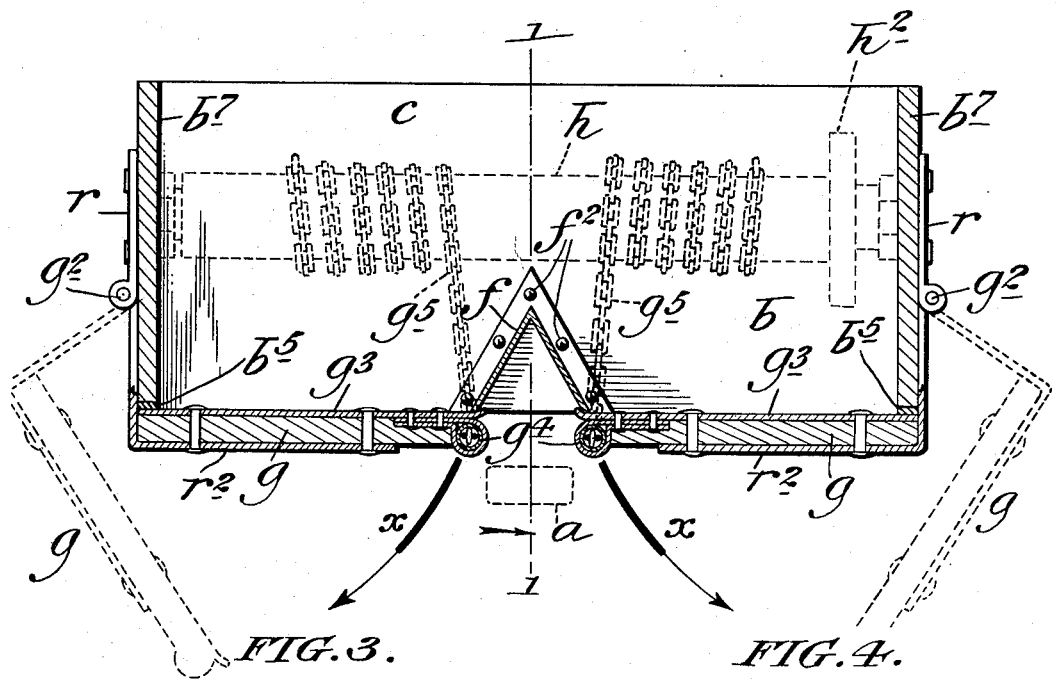
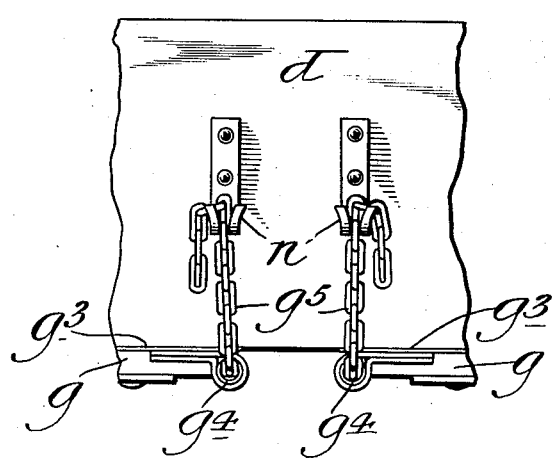
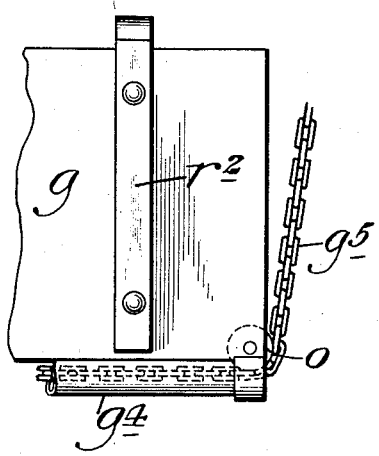
WITNESSES
A. R. Appleman
C. E. Mulreany
INVENTORS
Edward L. Faughnan
Thomas A. Faughnan
BY Edgar Tate & Co
ATTORNEYS

UNITED STATES PATENT OFFICE.

THOMAS A. FAUGHNAN AND EDWARD L. FAUGHNAN, OF ELIZABETH, NEW JERSEY.

DUMPING BED OR BODY FOR VEHICLES.

No. 888,601.      Specification of Letters Patent.      Patented May 26, 1908.

Application filed September 9, 1907. Serial No. 391,881.

*To all whom it may concern:*

Be it known that we, THOMAS A. FAUGHNAN and EDWARD L. FAUGHNAN, citizens of the United States, and residing at Elizabeth, in the county of Union and State of New Jersey, have invented certain new and useful Improvements in Dumping Beds or Bodies for Vehicles, of which the following is a specification, such as will enable those skilled in the art to which it appertains to make and use the same.

This invention relates to dumping beds or bodies for wagons, trucks and the like designed for use in hauling sand, gravel, dirt, brick and other material; and the object thereof is to provide an improvement in the beds or bodies of vehicles of this class which is simple in construction and operation and by means of which the entire contents of the bed or body may be instantly dumped by the driver of the vehicle and the bed or body closed for further use; a further object being to provide a bed or body for vehicles of the class specified which is detachable from the running gear or truck frame so that other beds or bodies of any desired construction may be used on said running gear or truck frame; and with these and other objects in view the invention consists in a dumping bed or body for vehicles constructed as hereinafter described and claimed.

The invention is fully disclosed in the following specification, of which the accompanying drawing forms a part, in which the separate parts of our improvement are designated by suitable reference characters in each of the views, and in which:—

Figure 1 is a longitudinal vertical section of our improved dumping bed or body taken on the line 1—1 of Fig. 2 and showing the running gear or truck frame of the vehicle in dotted lines; Fig. 2 a transverse section on the line 2—2 of Fig. 1; Fig. 3 a partial rear end view of our improved dumping bed or body; and, Fig. 4 a bottom plan view of one end portion of one of the bottom gates or doors of our improved dumping bed or body.

In the drawing forming part of this specification, reference being made to Fig. 1, we have indicated in dotted lines a running gear or truck of a vehicle of the class specified comprising the reach $a$, axles $a^2$, front and rear bolsters $a^3$ and $a^4$, hounds $a^5$ and wheels $a^6$, and in the practice of our invention, we provide a bed or body $b$ adapted to be detachably mounted on the bolsters $a^3$ and $a^4$. The bed or body $b$ is provided with a front end extension $b^2$ and a rear end extension $b^3$, the bottoms $b^4$ of which are provided with longitudinally arranged metal strips $b^5$ having downwardly directed lugs or projections $b^6$ between which the bolsters $a^3$ and $a^4$ fit so as to prevent the bed or body from moving longitudinally on the running gear or truck frame, and these metal strips $b^5$ may extend backwardly under the sides $b^7$ of the bed or body as shown in Fig. 2, if desired.

The bed or body is also provided in the front portion thereof with a transverse vertical partition $c$, and the rear end portion thereof with a similar transverse vertical partition $d$ between which is the load portion $e$ of the bed or body as shown in Fig. 1, and in the bottom of the load portion $e$ of the bed or body and centrally thereof is secured a longitudinal guard and strengthening bar or member $f$ which is preferably V-shaped in cross section as shown in Fig. 2, and which is permanently and rigidly secured to the partitions $c$ and $d$ as shown at $f^2$. The bottom of the load portion $e$ of the bed or body consists of gates or doors $g$ hinged to the sides of the bed or body at $g^2$, and the combined transverse width of which is preferably less than the transverse width of the bed or body as shown in Fig. 2, and the top surfaces of the gates or doors $g$ are preferably provided with metal covers or shields $g^3$, and beneath the inner or free edges thereof are placed longitudinal tubes $g^4$ through which are passed chains $g^5$.

In the front portion $b^2$ of the bed or body and adjacent to the partition $c$ is placed a transverse roller $h$ to which one end of the chains $g^5$ are secured, and said roller is provided at one end thereof, preferably the right hand end, with a ratchet wheel $h^2$ and loosely mounted on said end of said roller in the usual manner is a lever $i$ to which is pivoted a crank arm $i^2$ between which and the handle end of the lever $i$ is placed a spring $i^3$, and connected with the shorter end of the crank arm $i^2$ is a rod $i^4$ which is connected with a pawl $i^5$ which is pivoted to the lever $i$ and adapted to be thrown into engagement with the ratchet wheel $h^2$, but normally held out of said engagement by the spring $i^3$.

Connected with the bottom $b^4$ of the front portion $b^2$ of the bed or body is a support $j$ to which is pivoted a lever $k$, the rear end portion of which is extended backwardly and curved upwardly, and forwardly as shown at $k^2$, and provided with a pivoted pawl $k^3$ adapted to operate in connection with the ratchet wheel $h^2$ and having a depending end provided with a transverse head $k^4$ adapted to bear on the front edge or surface of the upwardly curved part of the rear end portion $k^2$ of the lever $k$, and the nose of the pawl $k^3$ is normally in engagement with the ratchet wheel $h^2$. The front end portion of the lever $k$ extends forwardly as shown in Fig. 1, and is adapted to be depressed by the foot of the operator of the vehicle so as to free the pawl $k^3$ from the ratchet wheel $h^2$, and the construction and operation of the lever $k$ and the pawl $k^3$ are similar to other devices of this class, but, in practice, we provide means for preventing the accidental depression of the front end of the lever $k$, and in the form of construction shown, we have provided a dog $m$ which is provided with a pivotal support and which is adapted to be thrown into position under the front end of the lever $k$ as shown in Fig. 1, and to be kicked out of position preparatory to depressing the front end of said lever in the operation of dumping the contents of the bed or body as hereinafter described.

We also secure to the outer surface of the transverse partition $d$, double or V-shaped hook devices $n$, and the rear ends of the chains $g^5$ are adapted to be connected with the said hook devices $n$ as shown in Fig. 3, and said chains may be shortened or lengthened within certain limits by means of raising or lowering the links thereof in the hook-shaped devices $n$, but our invention is not limited to any particular means for connecting the chains $g^5$ with the partition $d$ and any suitable devices may be employed for this purpose.

We also preferably place in the inner corners of the gates or doors $g$ grooved rollers or pulleys $o$, one of which is shown in Fig. 4 and over which the chains $g^5$ pass in the operation of raising and lowering the gates or doors $g$, and in Fig. 2, we have indicated in dotted lines the position of said gates or doors when open or partially open. In the construction shown the groove rollers or pulleys $o$ are placed horizontally in the corners of the gates or doors $g$ and the chains $g^5$ only operate in the grooves thereof when said gates or doors are lowered, or in their lowest position, or approximately so, but the said pulleys or rollers are not an essential feature and may or may not be employed, and in Figs. 1 and 3 they are not shown, but when said rollers or pulleys are not employed, we prefer to provide rounded or beveled anti-friction blocks or bearings $p$ as shown in Fig. 1 which are secured to the bottom of the partition $d$ and over which the chains $g^5$ pass in the operation of lowering and raising the gates or doors $g$.

The hinges by which the gates or doors $g$ are connected with the body $b$ are composed of parts $r$ secured to the sides of the bed or body and the L-shaped members $r^2$ secured to the bottoms of the gates or doors $g$, and in the operation of dumping as hereinafter described, the gates or doors $g$ move downwardly and outwardly as indicated in dotted lines in Fig. 2.

The operation will be readily understood from the foregoing description when taken in connection with the accompanying drawing and the following statement thereof. Suppose the gates or doors to be opened, as indicated in dotted lines in Fig. 2, the first thing to do is to close said gates or doors as shown in full lines in said figure, and in this operation the driver or operator of the vehicle grasps the handle end of the lever $i$ and the crank arm $i^2$. This operation forces the pawl $i^5$ into engagement with the ratchet wheel $h^2$ and by moving the lever $i$ upwardly and downwardly the chains will be wound on the roller $h$ and the gates or doors $g$ will be raised into the closed position. The locking lever $k$ is normally in operative position as shown in Fig. 1, and during the above described operation the pawl $k^3$ slides freely over the teeth of the ratchet wheel $h^2$, but when said operation is completed the pawl $k^3$ engages the teeth of the ratchet wheel $h^2$ and prevents the backward movement of the roller $h$ and the gates or doors $g$ are held in their closed position. The bed or body may now be filled with the desired contents and said contents transported to the place where it is to be used, or to any desired point, and when it is desired to dump the contents of the bed or body, the front end of the lever $k$ is depressed. This operation releases the pawl $k^3$ from the ratchet wheel $h^2$ and the gates or doors $g$ drop downwardly as indicated by the arrow $x$ is Fig. 1 and by the dotted lines in said figure, and the lever $i$ may then be manipulated to close the gates or doors $g$ as hereinbefore described.

It will be observed that the distance between the tubes $g^4$ through which the chains $g^5$ pass when the gates or doors $g$ are closed is about the same as the width of the reach $a$ of the running gear or truck of the vehicle and the part $f$ serves as a guard or shield for the reach $a$ in the operation of dumping the contents of the bed or body as hereinbefore described. By making the bed or body detachable from the running gear or truck any other kind or class of a bed or body may be employed in connection with said running gear or truck whenever desired, and in order to accommodate the running gear or truck to other beds or bodies of a greater length than our improved dumping bed or body we make the connections between the front and back trucks or axles adjustable, but it will be understood that the invention described and claimed herein is not limited to any particular form of running gear or truck.

It will also be understood that the tubes $g^4$ simply serve as guides or keepers for the chains $g^5$ which are free to slide therein and other forms of guides or keepers may be substituted for the tubes $g^5$, and other changes in and modifications of the construction herein described may be made, within the scope of the appended claims, without departing from the spirit of our invention or sacrificing its advantages.

Having fully described our invention, what we claim as new and desire to secure by Letters Patent, is:—

1. A dumping bed or body for vehicles, the front and rear end portions of which are provided with transverse partitions forming a load body proper at the front end of which is an extension, the bottom of the load body proper being provided with hinged gates or doors arranged longitudinally of the opposite sides thereof and the total width of which is less than the total width of the bed or body whereby a space is formed between the adjacent edges of said gates or doors when they are closed, a central member secured to the said transverse partitions and ranging longitudinally of the bottom of the load bed or body proper and closing said space, the free edges of said gates or doors being provided with tubes, and flexible devices passed through said tubes, means for connecting the rear ends of said flexible devices with the rear partition, a transverse roller mounted in the front extension and with which the front ends of said flexible devices are connected, and means for operating said roller to wind said flexible devices thereon so as to close said gates or doors and devices for releasing said roller so as to open said gates or doors.

2. A dumping bed or body for vehicles having a front extension, and a bottom composed of gates or doors hinged to the opposite sides thereof, the total transverse width of said gates or doors being less than the transverse width of the bed or body whereby a space is formed between said gates or doors when they are closed, said bed or body being also provided with a longitudinal member over said gates or doors and closing said space, and said gates or doors being provided at their free edges with keepers through which are passed flexible devices by the manipulation of which the said gates or doors may be closed and opened.

3. A detachable dumping bed or body for vehicles, said bed or body being provided with a bottom comprising gates or doors hinged to the opposite sides thereof and between which when said gates or doors are closed there is an open space, said bed or body being also provided with a stationary longitudinal member which closes said space, and said gates or doors being provided at their free edges with keepers, flexible devices movable longitudinally through said keepers, means for securing one end of said flexible devices at the rear end of the bed or body, and means at the front end of the bed or body for manipulating said flexible devices so as to open and close said gates or doors.

In testimony that we claim the foregoing as our invention we have signed our names in presence of the subscribing witnesses this fourth day of September 1907.

THOMAS A. FAUGHNAN.
EDWARD L. FAUGHNAN.

Witnesses:
A. W. HANGARTER,
J. P. KELLY.